(12) United States Patent
Tahir et al.

(10) Patent No.: US 11,597,353 B2
(45) Date of Patent: Mar. 7, 2023

(54) SELF CLEANING MODULAR FLOOR SYSTEM FOR ROBOTAXIS AND PASSENGER VEHICLES

(71) Applicant: GM Global Technology Operations LLC, Detroit, MI (US)

(72) Inventors: Muhammad I. Tahir, Toronto (CA); Hamid Tahir, Markham (CA); Rajaneesh K. Mutyalapati, Scarborough (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 147 days.

(21) Appl. No.: 17/162,415

(22) Filed: Jan. 29, 2021

(65) Prior Publication Data

US 2022/0242374 A1  Aug. 4, 2022

(51) Int. Cl.
*B60S 1/64* (2006.01)
*H02K 7/10* (2006.01)
*A47L 11/40* (2006.01)

(52) U.S. Cl.
CPC ............. *B60S 1/64* (2013.01); *A47L 11/4025* (2013.01); *H02K 7/1004* (2013.01)

(58) Field of Classification Search
CPC ...... B60S 1/64; A47L 11/4025; H02K 7/1004; B08B 1/008; B60N 2/01; B60N 3/04; B60N 3/08; B62D 25/20
See application file for complete search history.

(56) References Cited

FOREIGN PATENT DOCUMENTS

| DE | 102018005794 | * | 1/2019 |
| FR | 2376016 A | * | 9/1978 |
| FR | 2574728 A | * | 12/1984 |
| KR | 20090084063 A | * | 1/2008 |

\* cited by examiner

*Primary Examiner* — David Redding
(74) *Attorney, Agent, or Firm* — Vivacqua Crane PLLC

(57) ABSTRACT

An automobile vehicle self-cleaning modular floor system includes a self-cleaning modular assembly positioned in a passenger compartment of an automobile vehicle and including a tread portion, the tread portion having a first face and an oppositely directed second face. The first face of the tread portion when upwardly directed defines a first position of the tread portion, with a waste item collecting onto the first face in the first position during operation of the automobile vehicle. The tread portion is selectively moved from the first position to a second position having the first face downwardly directed and the second face upwardly directed. A waste collection tray is positioned below the tread portion to receive the waste item when the tread portion is in the second position.

18 Claims, 4 Drawing Sheets

SELF CLEANING MODULAR FLOOR SYSTEM FOR ROBOTAXIS AND PASSENGER VEHICLES

INTRODUCTION

The present disclosure relates to automobile vehicle cleaning systems and a method for internally cleaning automobile vehicles.

Automobile vehicles including but not limited to passenger cars, trucks, sport utility vehicles, vans, taxis, robotaxis, electric vehicles, and autonomously operated vehicles are operated in any weather and seasonal conditions. Passengers using the automobile vehicle also generate waste such as food, beverages and garbage which may be left behind when the passengers exit the vehicle. This exposes an interior of the automobile vehicles to dirt, waste, water, snow, ice, and the like. Maintaining cleanliness of automobile vehicles enhances passenger safety and to enhance ease of entry and operational use of the vehicle. Known automobile vehicles are commonly cleaned using manual procedures. These procedures are commonly manual removal of garbage and trash, and manual operations such as vacuum cleaning, wiping and disinfecting to clean floors, carpeting and floor mats. Manual cleaning procedures require access to cleaning equipment not commonly present in a vehicle, are time consuming and require access to a waste receptacle to discard the waste. For taxi and ride-sharing vehicles, operating time may be lost because vehicle cleaning cannot be performed while the vehicle is in-transit to pick up a next fare.

Thus, while current manual automobile vehicle cleaning methods achieve their intended purpose, there is a need for a new and improved system and method for cleaning automobile vehicles.

SUMMARY

According to several aspects, an automobile vehicle self-cleaning modular floor system includes a self-cleaning modular assembly positioned in a passenger compartment of an automobile vehicle and including a tread portion, the tread portion having a first face and an oppositely directed second face. The first face of the tread portion when upwardly directed defines a first position of the tread portion, with a waste item collecting onto the first face in the first position during operation of the automobile vehicle. The tread portion is selectively moved from the first position to a second position having the first face downwardly directed and the second face upwardly directed. A waste collection tray is positioned below the tread portion to receive the waste item when the tread portion is in the second position.

In another aspect of the present disclosure, the flexible member is supported on a first end by a first roller member and on an opposite second end by a second roller member.

In another aspect of the present disclosure, a power device is included. A transfer member is connected to the power device and to one of the first or the second roller member to rotate the first roller member or the second roller member and displace the tread portion when the power device is operated.

In another aspect of the present disclosure, the power device defines an electric motor, and the transfer member defines one of a belt or a chain.

In another aspect of the present disclosure, the tread portion includes multiple positive contact features to increase direct contact for passengers to the tread portion during entrance into the automobile vehicle, during vehicle travel and while exiting from the automobile vehicle.

In another aspect of the present disclosure, the positive contact features include at least one of raised ribs, increased surface area elements, raised surface elements, recessed ribs and cavities.

In another aspect of the present disclosure, the waste collection tray is manually removed in a removal direction to remove the waste item from the waste collection tray and returned in an opposite return direction.

In another aspect of the present disclosure, the flexible member defines a continuous belt of a polymeric material.

In another aspect of the present disclosure, a removal device is in direct contact with an outer surface of the tread portion to remove the waste item by direct physical contact with the waste item when the tread portion moves from the first position to the second position.

In another aspect of the present disclosure, a heating mechanism is positioned proximate to the tread portion and energized to thaw out a frozen object defining the waste item including snow or ice adhered to the tread portion.

According to several aspects, an automobile vehicle self-cleaning modular floor system includes a self-cleaning modular assembly is positioned in a passenger compartment of an automobile vehicle and includes a tread portion, the tread portion having a first face and an oppositely directed second face. The first face of the tread portion when upwardly directed defines a first position of the tread portion and when downwardly directed defines a second position of the tread portion. A signal is generated when no passengers are sensed in the passenger compartment, the signal directing the tread portion to automatically displace from the first position to the second position. A waste collection tray is positioned below the tread portion. A waste item collected on the first face in the first position during operation of the automobile vehicle is displaced into the waste collection tray when the tread portion is displaced from the first position to the second position.

In another aspect of the present disclosure, a sensing device generates the signal.

In another aspect of the present disclosure, the sensing device defines a camera, a proximity sensor, or an ultrasonic sensor to sense passenger presence, or a pressure sensor in a vehicle seat to sense a passenger presence.

In another aspect of the present disclosure, a removal device is in direct contact with an outer surface of the tread portion.

In another aspect of the present disclosure, the removal device defines a brush to remove the waste item by direct physical contact with the waste item when the tread portion moves from the first position to the second position, the waste item thereafter falling by gravity into the waste collection tray.

In another aspect of the present disclosure, a first roller member supports a first end of the tread portion. A second roller member supports a second end of the tread portion. A distance between the first roller member and the second roller member is adjusted to change a tension of the tread portion.

In another aspect of the present disclosure, an electric motor is provided. A transfer member is provided to transfer a rotational force from the electric motor. A friction member is connected to the second roller member and to the transfer member to rotate the second roller member and displace the tread portion when the electric motor is operated.

According to several aspects, a method for operating an automobile vehicle self-cleaning modular floor system includes: performing a querying operation to determine if any passengers are present in a passenger compartment of an automobile vehicle; sending an initiation signal to begin operation of a self-cleaning modular assembly if no passengers are present in the passenger compartment indicated by a compartment status signal; following a predetermined time period allowing movement of a first face of the self-cleaning modular assembly which is initially upwardly directed to collect waste items during operation of the automobile vehicle defining a first position to reposition the first face to a downwardly directed second position; displacing the waste items into a holding cavity of a waste collection tray; and manually removing the waste collection tray to allow removal of the waste items and cleaning of the waste collection tray.

In another aspect of the present disclosure, the method further includes returning to the querying operation if one or more passengers are present as identified in the querying operation and indicated by a passenger present signal.

In another aspect of the present disclosure, the method further includes stopping operation of the self-cleaning modular assembly in a stop action step if the presence of one or more passengers is sensed within the passenger compartment during operation of the self-cleaning modular assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
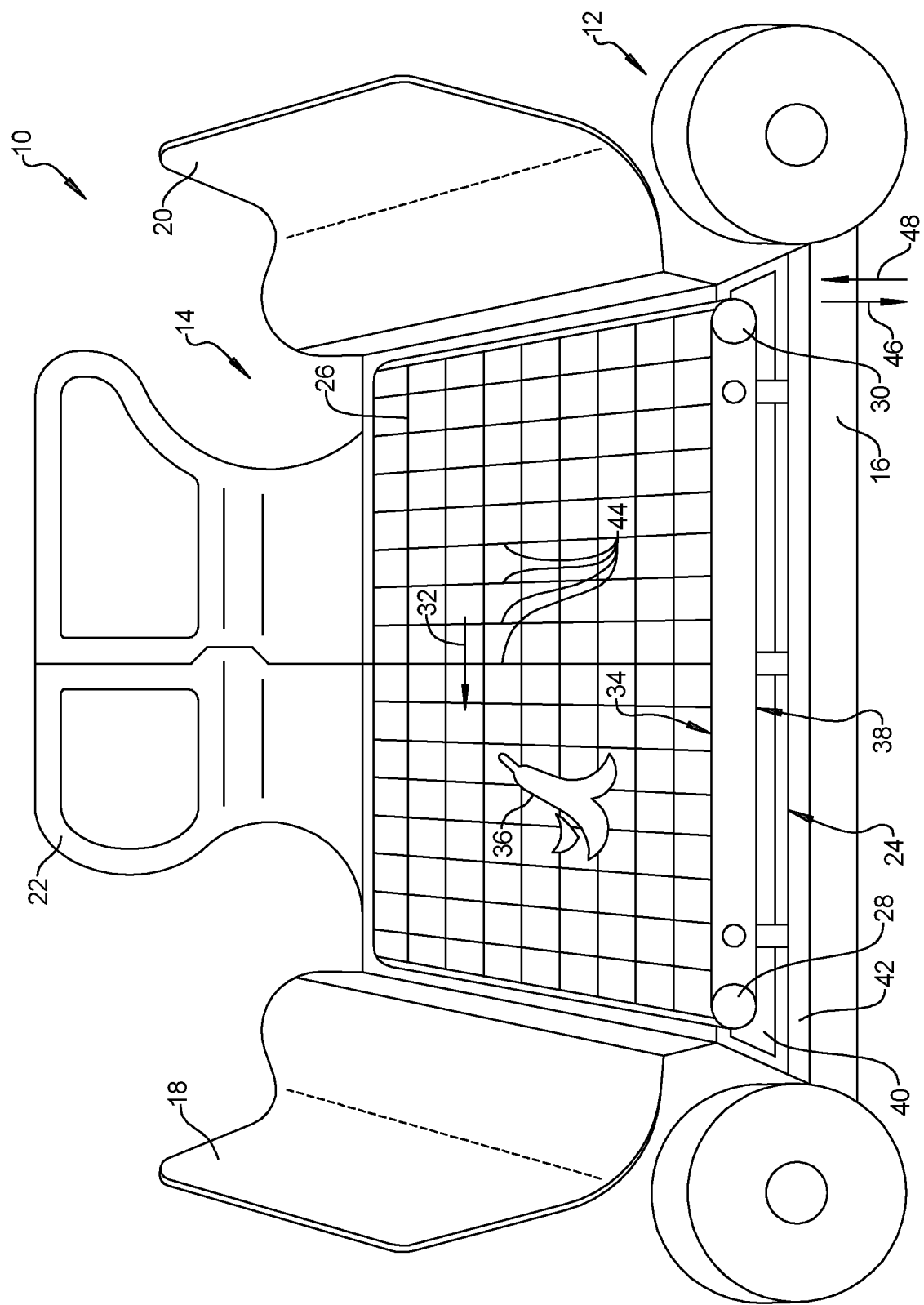
FIG. 1 is a side perspective view of an automobile vehicle having a self-cleaning modular floor system according to an exemplary aspect.

Referring to FIG. 1, an automobile vehicle self-cleaning modular floor system 10 and method for use of the automobile vehicle self-cleaning modular floor system 10 is provided for an automobile vehicle 12 having a passenger compartment 14 supported by a vehicle frame 16. According to several aspects, the automobile vehicle 12 defines a robo-taxi having a first seat member 18 oppositely facing from a second seat member 20 positioned within the passenger compartment 14. The automobile vehicle 12 is not limited to a robo-taxi, and may be configured as a passenger vehicle such as a sedan, a sport utility vehicle, a pickup truck, a commercial truck, a van, an autonomous vehicle, an electric vehicle and the like, therefore the quantity and configuration of seats within the automobile vehicle 12 may vary from that shown in FIG. 1 within the scope of the present disclosure. At least one door 22 provides entrance and egress for at least one passenger into and out of the passenger compartment 14.

According to several aspects, a self-cleaning modular assembly 24 is positioned in the passenger compartment 14 and is supported on the vehicle frame 16 and is positioned between and below an elevation of the first seat member 18 and the second seat member 20. The self-cleaning modular assembly 24 includes a tread portion 26 which according to several aspects defines a flexible member such as a polymeric material continuous belt which is supported on a first end by a first roller member 28 and on an opposite second end by a second roller member 30. The tread portion 26 may be displaced for example in a displacement direction 32 such that a first face 34 which is upwardly directed in the view defined in FIG. 1 defining a first position onto which waste items 36 collect during operation of the automobile vehicle 12 is repositioned to an second position defined by a second face 38 which is downwardly directed in the view defined in FIG. 1.

This displacement of the tread portion 26 allows the waste items 36 to drop by gravity into a holding cavity 40 of a waste collection tray 42 positioned below the tread portion 26. The waste collection tray 42 is manually removable from the automobile vehicle 12 in a removal direction 46 to discharge the waste items 36 and to clean the holding cavity 40. After cleaning, the waste collection tray 42 is returned to a collection position shown in FIG. 1 in a return direction 48 opposite to the removal direction 46. According to several aspects the waste collection tray 42 is completely removed from the automobile for cleaning. According to further aspects, the waste collection tray 42 is moved outwardly in the removal direction 46 to a cleaning position which is removably latched or fixedly connected to the automobile vehicle 12 to prevent loss of the waste collection tray 42, cleaned and manually returned in the return direction 48 to the collection position. The waste items 36 as defined herein may consist of but are not limited to food items, garbage and trash, liquids, ice, snow, mud or dirt, and the like.

According to several aspects, the tread portion 26 may include multiple positive contact features 44 to increase direct contact for passengers during entrance into the automobile vehicle 12, during vehicle travel and while exiting from the automobile vehicle 12. The positive contact features 44 may include raised ribs, rough surface elements including surfaces having increased surface area to enhance frictional contact, raised surface elements, recessed ribs or cavities and the like. The positive contact features 44 may be integral with the tread portion 26, such as elements co-molded or formed with the tread portion 26 or may be added or connected to the tread portion 26. The tread portion 26 as noted above may define a rubber or polymeric material continuous belt or may define multiple flexibly connected elements similar to a tank tread, and the like.

Referring to FIG. 2 and again to FIG. 1, according to several aspects the self-cleaning modular assembly 24 may include a power device 50 such as an electric motor operated to displace the tread portion 26. Power may be transferred from the power device 50 by rotating a transfer member 52 which may define a gear to transfer a rotational force from the power device via a friction member 54 which may be for example a belt or a chain connected to the second roller member 30 and the transfer member 52, thereby rotating the second roller member 30 and displacing the tread portion 26. A tension of the tread portion 26 may be provided and adjusted by changing a distance 56 between the first roller member 28 and the second roller member 30.

After the first face 34 of the tread portion 26 collects the waste items 36 during operation of the automobile vehicle 12 and is repositioned to the alternate position defined by the second face 38, the waste items 36 may be removed by gravity fall into the holding cavity 40 of the waste collection tray 42. The waste items 36 may be also be removed by direct physical contact with an outer surface 58 of the tread portion 26 by a removal device 60, which according to several aspects may be a brush, a pad, or a block. The removal device 60 may be displaced for example in a rotational motion by a displacement device 62 which is connected to a wall 64 of the waste collection tray 42. As an alternative to the removal device 60 displaced by the displacement device 62, a fixed scraper 66 may be provided which directly contacts the outer surface 58 for removal of the waste items 36. According to several aspects the fixed scraper 66 may be connected to the waste collection tray 42 such as directly to the wall 64.

According to other aspects, a core such as a solid core may be positioned within the continuous tread portion 26. The core provides support for passengers to stand on the first face 34 during entrance and use of the automobile vehicle 12. The core may be positioned in a space between the first face 34 and the second face 38, and between the first roller member 28 and the second roller member 30, and therefore may be supported to vehicle structure on opposed sides of the tread portion 26.

Figure 2:
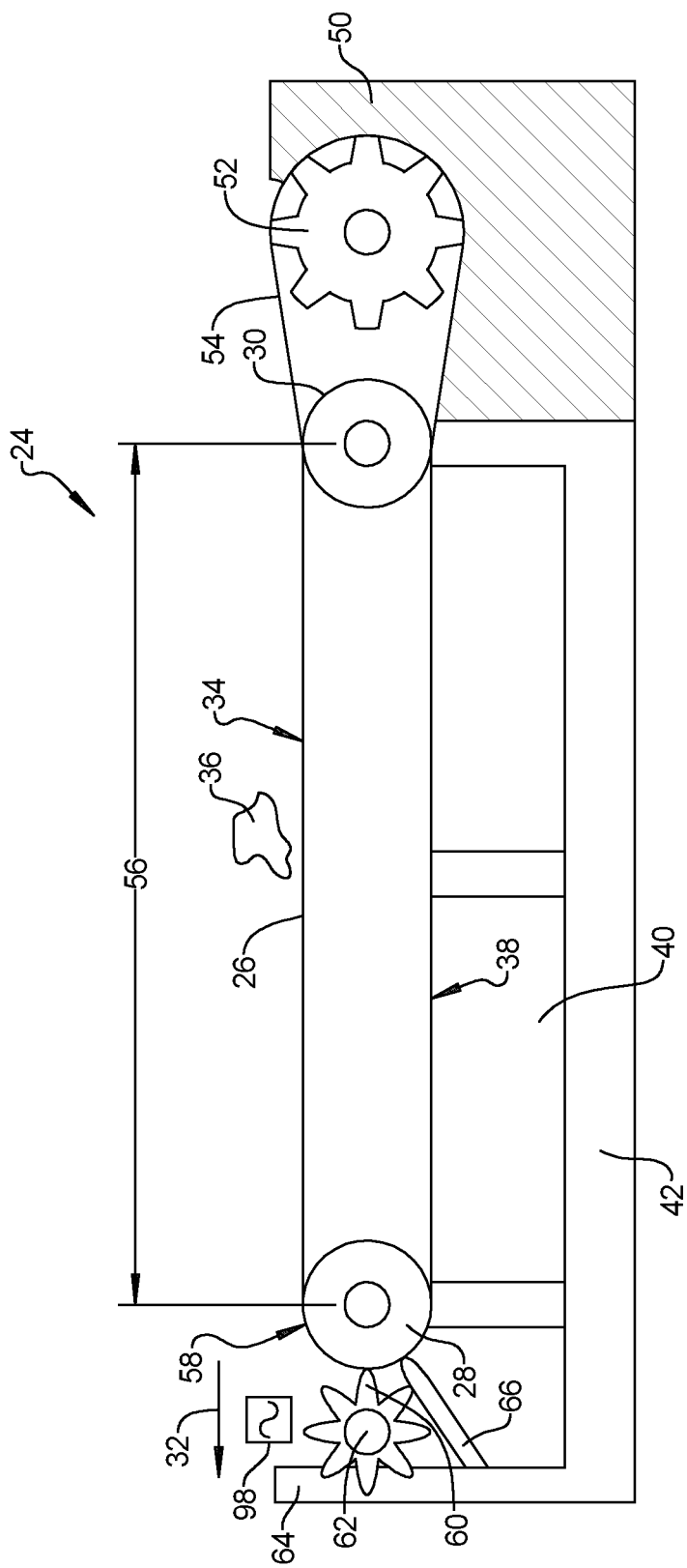
FIG. 2 is a side elevational view of the self-cleaning modular floor system of FIG. 1.

Referring to FIG. 3 and again to FIGS. 1 and 2, in an exemplary aspect the automobile vehicle 12 is presented as a robo-taxi which may be autonomously operated. The automobile vehicle 12 positions the tread portion 26 between the oppositely facing first seat member 18 and the second seat member 20. According to several aspects, a divider wall 68 may be centrally positioned in the automobile vehicle passenger compartment 14 providing separation between a first passenger 70 and a second passenger 72. The tread portion 26 collects the waste items 36 regardless of which side of the divider wall 68 the waste items 36 fall.

According to several aspects, an actuation device 74 which may define a cell phone, a computer or the like may be preprogrammed to allow one of the passengers such as the first passenger 70 to actuate the self-cleaning modular assembly 24 prior to entry of the passengers into the passenger compartment 14 or after the passengers exit the passenger compartment 14. A control unit 76 may also be provided with the automobile vehicle 12 which automatically initiates operation of the self-cleaning modular assembly 24 prior to entry of the passengers into the passenger compartment 14 or after the passengers exit the passenger compartment 14 to clean the automobile vehicle 12 prior to a subsequent use. A sensing device 78 such as a camera may forward a status signal to the control unit 76 to indicate no passengers are present in the passenger compartment 14 thereby allowing initiation of the self-cleaning modular assembly 24. According to other aspects, the sensing device 78 may also be a proximity sensor or an ultrasonic sensor to sense passenger presence, or a pressure sensor in a vehicle seat to sense a passenger presence.

Figure 3:
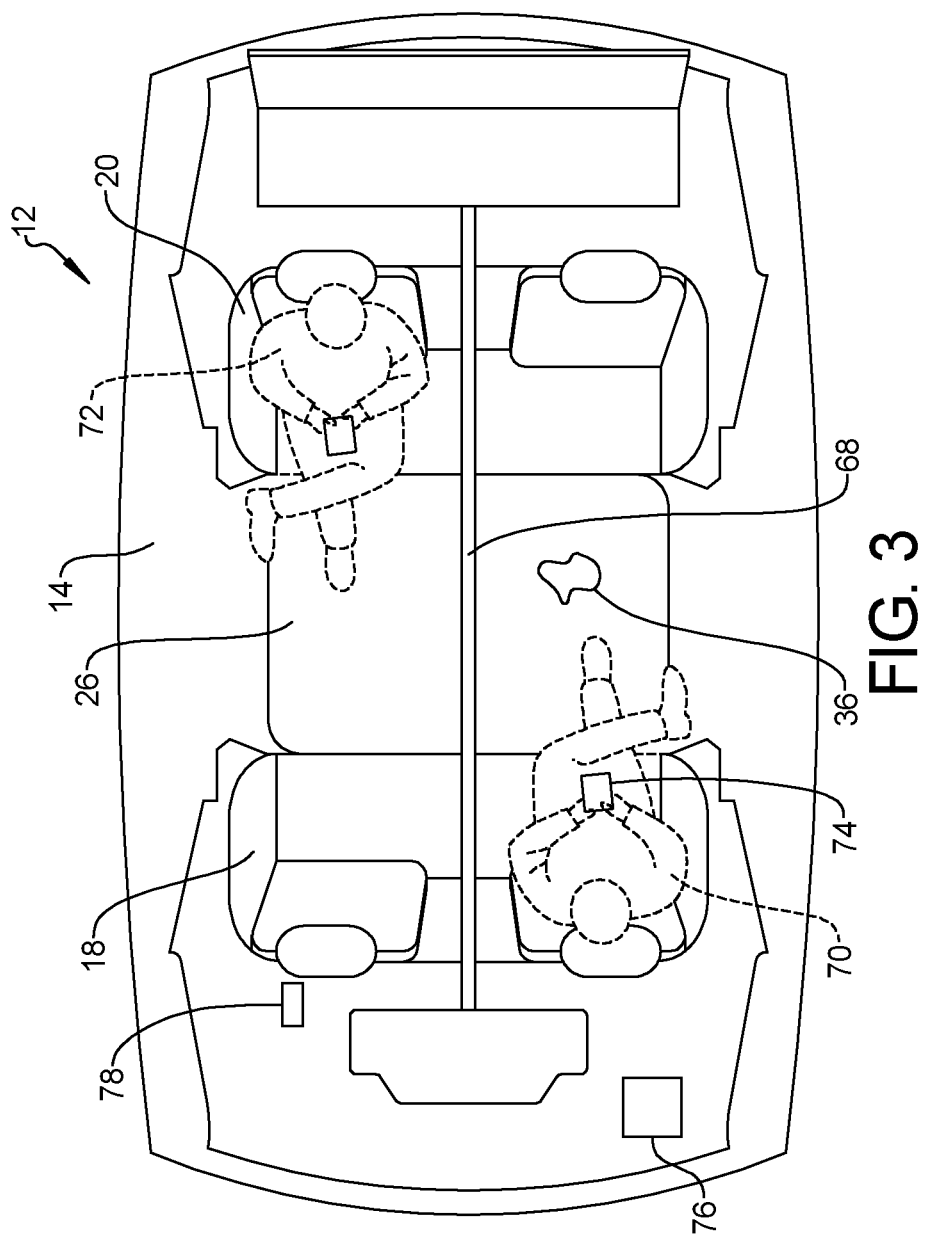
FIG. 3 is a top plan view of the vehicle of FIG. 1.
Figure 4:
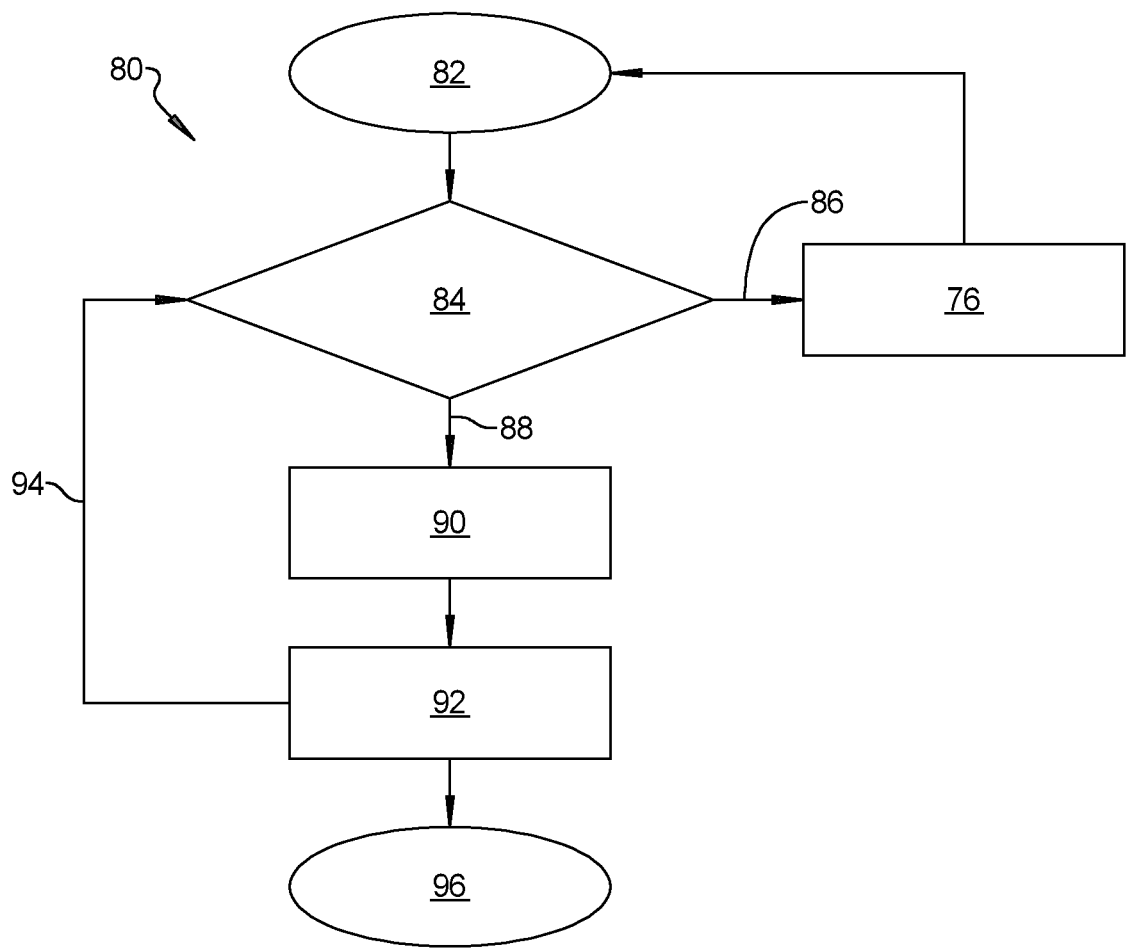
FIG. 4 is a flow diagram of exemplary operational steps for the system of the present disclosure.

Referring to FIG. 4 and again to FIGS. 1 through 3, an operational flow diagram 80 identifies steps for operation of the automobile vehicle self-cleaning modular floor system 10 and the self-cleaning modular assembly 24. Following a system initiation step 82 a query operation 84 is performed to identify if any passengers are present in the passenger compartment 14 of the automobile vehicle 12. If one or more passengers are present, which may be indicated by a passenger present signal 86 generated by the control unit 76 the program returns to the system initiation step 82. If no passengers are present in the passenger compartment 14 indicated by a compartment status signal 88, the control unit 76 signals using an initiation signal 90 for operation of the self-cleaning modular assembly 24 to begin. Following a predetermined time period allowing movement of the first face 34 which is upwardly directed in the view defined in FIG. 1 which collects waste items 36 during operation of the automobile vehicle 12, the first face 34 is repositioned to the alternate position defined by the second face 38 which is downwardly directed in the view defined in FIG. 1, thereby displacing the waste items 36 into the holding cavity 40 of the waste collection tray 42. In a stop action step 94 operation of the self-cleaning modular assembly 24 is stopped if the presence of one or more passengers is sensed within the passenger compartment 14 during operation of the self-cleaning modular assembly 24. After completion of a cleaning operation the program ends at an end step 96.

With continued reference to FIGS. 1 through 4, the automobile vehicle self-cleaning modular floor system 10 may be operated as follows. Initially, input from the automobile vehicle 12 is requested to identify a passenger compartment status, defining no passenger present in the automobile vehicle passenger compartment 14. One or more of the power devices 50 which may be positioned under the first seat member 18 or the second seat member 20 are energized to rotate the first roller member 28 and the second roller member 30 to displace the tread portion 26.

According to a further aspect, the removal device 60 such as a brush placed proximate to the outer surface 58 of the tread portion 26 starts rotating and brushing the tread portion 26 for a more rigorous cleaning of the tread portion 26.

After a half cycle of operation of the power device 50 and displacement of the tread portion 26 to a bottom-side-up position, the waste items 36 such as garbage/dirt fall onto the waste collection tray 42 positioned underneath the tread portion 26.

After the bottom-side-up position of the tread portion 26 is reached the power device 50 is stopped. Passengers can then be loaded at this time.

With continuing reference to FIG. 2, according to a further aspect, in a winter configuration a heating mechanism 98 positioned proximate to the tread portion 26 is energized on to thaw out a frozen object defining the waste item 36 including snow or ice that may adhere to or beneath the tread portion 26. Melted snow as a liquid including water and dirt drips into the waste collection tray 42. Liquids in the waste collection tray 42 are subsequently dried.

The preceding steps may be repeated at any time the automobile vehicle self-cleaning modular floor system 10 confirms no passengers are present in the automobile vehicle 12. This may include periods of vehicle travel between passenger travel events, prior to initial passenger travel, and after completion of passenger travel.

Following an operational cycle of the automobile vehicle 12 the waste collection tray 42 is removed and cleaned, for example at the end of an operational day. According to further aspects, the waste collection tray 42 may be cleaned without removal from the automobile vehicle 12. For example, cleaning may be provided via an access hatch from below the automobile vehicle 12 opened to allow waste items to fall out, or a designated area or hatch may be provided where cleaning access is provided for example as a suction fitting for attachment of a vacuum cleaning system or for manual waste item removal.

The automobile vehicle self-cleaning modular floor system 10 of the present disclosure provides for cleanliness of robo-taxis defining autonomously operated taxis, engine powered taxis, passenger vehicles, and other vehicles. This includes automatic removal of garbage or leftover removal once or multiple times during a period of operation.

The automobile vehicle self-cleaning modular floor system 10 provides increased passenger safety in winter by automatically cleaning the passenger compartment 14 with no need to return to a base station, parking area or garage. The waste collection tray 42 which retains the waste items 36 may be designed to retain a substantial volume of the waste items 36 for either immediate cleaning or for holding for an extended period of time such that emptying and cleaning the waste collection tray 42 may be conducted at a time and place which is convenient to the operator. A modular and reconfigurable vehicle floor supports possible upgrades and personalization, summer vs winter automatic floor cleaning configurations and enhanced passenger safety by eliminating trip hazards with no human intervention. The automobile vehicle self-cleaning modular floor system 10 provides an on-demand self-cleaning capability using the tread portion 26.

The automobile vehicle self-cleaning modular floor system 10 of the present disclosure offers several advantages. These include provision of a stand-alone floor module for self-cleaning in-between rides. The system and method of the present disclosure includes a module having a moving tread floor that displaces waste, garbage and environmental products to a collection tray under the tread portion 26 for subsequent removal. The module is configurable for seasonal use including winter weather cleaning when ice and snow may be present.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle self-cleaning modular floor system, comprising:
   a self-cleaning modular assembly positioned in a passenger compartment of an automobile vehicle and including a tread portion, the tread portion having a first face and an oppositely directed second face;
   the first face of the tread portion when upwardly directed defining a first position of the tread portion, with a waste item collecting onto the first face in the first position during operation of the automobile vehicle, the tread portion selectively moved from the first position to a second position having the first face downwardly directed and the second face upwardly directed; and
   a waste collection tray positioned below the tread portion to receive the waste item when the tread portion is in the second position, wherein the waste collection tray is manually removed in a removal direction to remove the waste item from the waste collection tray and returned in an opposite return direction.

2. The system of claim 1, wherein the tread portion is supported on a first end by a first roller member and on an opposite second end by a second roller member.

3. The system of claim 2, further including:
   a power device; and
   a transfer member connected to the power device and to one of the first and the second roller member to rotate the first roller member and the second roller member and displace the tread portion when the power device is operated.

4. The system of claim 3, wherein:
   the power device defines an electric motor; and
   the transfer member defines one of a belt and a chain.

5. The system of claim 1, wherein the tread portion includes multiple positive contact features to increase direct contact for passengers to the tread portion during entrance into the automobile vehicle, during vehicle travel and while exiting from the automobile vehicle.

6. The system of claim 5, wherein the positive contact features include at least one of raised ribs, frictional elements, raised surface elements, recessed ribs and cavities.

7. The system of claim 1, wherein the tread portion defines a continuous polymeric belt.

8. The system of claim 1, including a removal device in direct contact with an outer surface of the tread portion to remove the waste item by direct physical contact with the waste item when the tread portion moves from the first position to the second position.

9. The system of claim 1, including a heating mechanism positioned proximate to the tread portion and energized to thaw out a frozen object defining the waste item including snow or ice adhered to the tread portion.

10. An automobile vehicle self-cleaning modular floor system, comprising:
    a self-cleaning modular assembly positioned in a passenger compartment of an automobile vehicle and including a tread portion, the tread portion having a first face and an oppositely directed second face, wherein the first face of the tread portion when upwardly directed defines a first position of the tread portion and when downwardly directed defines a second position of the tread portion;
    a signal generated when no passengers are sensed in the passenger compartment, the signal directing the tread portion to automatically displace from the first position to the second position;
    a waste collection tray positioned below the tread portion; and
    a sensing device generating the signal,
    wherein a waste item collected on the first face in the first position during operation of the automobile vehicle is displaced into the waste collection tray when the tread portion is displaced from the first position to the second position.

11. The system of claim 10, wherein the sensing device defines a camera.

12. The system of claim 10, including a removal device in direct contact with an outer surface of the tread portion.

13. The system of claim 12, wherein the removal device defines a brush to remove the waste item by direct physical contact with the waste item when the tread portion moves from the first position to the second position, the waste item thereafter falling by gravity into the waste collection tray.

14. The system of claim 10, including:
    a first roller member supporting a first end of the tread portion; and
    a second roller member supporting a second end of the tread portion; and
    wherein a distance between the first roller member and the second roller member is adjusted to change a tension of the tread portion.

15. The system of claim 14, including:
    an electric motor;
    a transfer member to transfer a rotational force from the electric motor; and
    a friction member connected to one of the first roller member and the second roller member and connected to the transfer member to rotate the one of the first roller member and the second roller member to displace the tread portion when the electric motor is operated.

16. A method for operating an automobile vehicle self-cleaning modular floor system, comprising:
performing a querying operation to determine if at least one passenger is present in a passenger compartment of an automobile vehicle;
sending an initiation signal to initiate motion of a self-cleaning modular assembly if the at least one passenger is not present in the passenger compartment indicated by a compartment status signal;
following a predetermined time period of motion of a first face of the self-cleaning modular assembly which is initially upwardly directed to collect waste items during operation of the automobile vehicle defining a first position to reposition the first face to a downwardly directed second position;
displacing the waste items into a holding cavity of a waste collection tray; and
manually removing the waste collection tray to allow removal of the waste items and cleaning of the waste collection tray.

17. The method of claim 16, further including returning to the querying operation if the at least one passenger is present indicated by a passenger present signal.

18. The method of claim 16, further including stopping motion of the self-cleaning modular assembly in a stop action step if the presence of the at least one passenger is sensed within the passenger compartment after motion of the self-cleaning modular assembly begins.

\* \* \* \* \*